(12) United States Patent
Kim et al.

(10) Patent No.: US 11,424,446 B2
(45) Date of Patent: Aug. 23, 2022

(54) ANODE ACTIVE MATERIAL FOR SECONDARY BATTERY, MANUFACTURING METHOD THEREOF, AND LITHIUM SECONDARY BATTERY INCLUDING THE SAME

(71) Applicant: KOREA BASIC SCIENCE INSTITUTE

(72) Inventors: Yeon Ho Kim, Daejeon (KR); Hae Jin Kim, Daejeon (KR); Won Gi Hong, Daejeon (KR); Jong Guk Kim, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 487 days.

(21) Appl. No.: 16/182,890

(22) Filed: Nov. 7, 2018

(65) Prior Publication Data

US 2019/0140275 A1 May 9, 2019

(30) Foreign Application Priority Data

Nov. 8, 2017 (KR) .......................... 10-2017-0147936

(51) Int. Cl.
*H01M 4/52* (2010.01)
*H01M 10/0525* (2010.01)
*H01M 4/62* (2006.01)
*H01M 50/411* (2021.01)
*H01M 4/02* (2006.01)

(52) U.S. Cl.
CPC ............ *H01M 4/523* (2013.01); *H01M 4/622* (2013.01); *H01M 4/625* (2013.01); *H01M 10/0525* (2013.01); *H01M 50/411* (2021.01); *H01M 2004/027* (2013.01)

(58) Field of Classification Search
CPC .............................. H01M 4/521; H01M 4/523
See application file for complete search history.

(56) References Cited

U.S. PATENT DOCUMENTS

| | | | | |
|---|---|---|---|---|
| 9,039,788 B2 * | 5/2015 | Xu | ........................ | H01M 4/621 |
| | | | | 29/623.1 |
| 2013/0089739 A1 * | 4/2013 | Polshettiwar | ........ | B01J 23/8892 |
| | | | | 428/402 |

FOREIGN PATENT DOCUMENTS

| JP | 2008204777 | | 4/2008 |
|---|---|---|---|
| JP | 2008204777 | * | 9/2008 |
| JP | 2008204777 A | * | 9/2008 |
| JP | 2017174649 | | 9/2017 |
| KR | 101350400 | * | 12/2011 |
| KR | 101350400 B1 | * | 12/2011 |
| KR | 1020140095869 | | 10/2015 |

OTHER PUBLICATIONS

S. Riaz, R. Ashraf, A. Akbar and S. Naseem, "Microwave Assisted Iron Oxide Nanoparticles—Structural and Magnetic Properties," in IEEE Transactions on Magnetics, vol. 50, No. 8, pp. 1-4, Aug. 2014, Art No. 2201504, doi: 10.1109/TMAG.2014.2313117. (Year: 2014).*

* cited by examiner

*Primary Examiner* — Ula C Ruddock
*Assistant Examiner* — Thomas H. Parsons
(74) *Attorney, Agent, or Firm* — Porzio Bromberg & Newman P.C.

(57) ABSTRACT

Provided are an anode active material for secondary battery which includes porous iron oxide nanoparticles, a manufacturing method thereof, and a secondary battery including the same. The anode active material for secondary battery of the present disclosure minimizes a volume change of iron oxide caused by intercalation and deintercalation of lithium even during consecutive charges and discharges and thus can improve the capacity and lifespan characteristics of a secondary battery employing the anode active material. Further, the manufacturing method of an anode active material for secondary battery makes it possible to manufacture an anode active material for secondary battery including iron oxide nanoparticles in an environmentally friendly and simple manner and thus makes it possible to mass-produce the anode active material.

5 Claims, 4 Drawing Sheets

ANODE ACTIVE MATERIAL FOR SECONDARY BATTERY, MANUFACTURING METHOD THEREOF, AND LITHIUM SECONDARY BATTERY INCLUDING THE SAME

CROSS-REFERENCE TO RELATED APPLICATIONS

This application claims the benefit under 35 U.S.C. 119(a) of Korean Patent Application No. 10-2017-0147936 filed on Nov. 8, 2017 in the Korean Intellectual Property Office, the entire disclosure of which is incorporated herein by reference for all purposes.

BACKGROUND

Field

The present disclosure relates to an anode active material for secondary battery, a manufacturing method thereof, and a lithium secondary battery including the same and more particularly, to an anode active material including porous iron oxide nanoparticles, a manufacturing method thereof, and a lithium secondary battery including the same.

Description of the Related Art

Secondary batteries which can be repeatedly charged and discharged have been used as power sources for portable electronic devices, such as mobile phones, laptop computers, and digital cameras, electric-powered cars, electric-powered bicycles, etc. and the demand for the secondary batteries has soared. Particularly, the development of secondary batteries with high performance is needed due to the fact that whether or not the performance of electric-powered cars can be continuously exhibited depends on secondary batteries as energy sources.

Examples of the secondary batteries include a nickel-cadmium battery, a nickel hydrogen battery, a nikel-zinc battery, a lithium secondary battery, etc. Particularly, the lithium secondary battery with high voltage and energy density has received the most attention. The lithium secondary battery can be discharged and recharged by intercalation and deintercalation of reversible lithium ions and has a high operating voltage and a high energy density per unit weight and thus can be easily decreased in size and increased in capacity.

A cathode, an anode, and an electrolyte are core components of a unit cell included in a lithium secondary battery. The cathode refers to an electrode into which lithium ions are intercalated during a discharge. The lithium ions intercalated into the cathode make charge neutrality with charges transferred through an external conducting wire. The anode refers to an electrode from which lithium ions are deintercalated during a discharge and in which the lithium ions are oxidized during the discharge. The electrolyte refers to a material that helps intercalate and deintercalate lithium ions. The lithium secondary battery may further include a separator, a case, etc. in addition to the unit cell.

Specifically, the cathode is manufactured by bonding a mixture of a cathode active material, a conductor, and a binder to a current collector. Lithium transition metal oxides such as $LiCoO_2$, $LiMn_2O_4$, $LiNiO_2$, $LiMnO_2$, etc. are mainly used as the cathode active material. When lithium ions are intercalated into or deintercalated from a crystal structure of the cathode active material, a current is generated. In general, the cathode active material has a high reduction potential.

On the other hand, lithium metal, carbon or graphite, silicon, etc. are mainly used as an anode active material, and the anode active material has a low reduction potential. Conventionally, lithium metal with very high energy density has been usually used as the anode active material in the lithium secondary battery.

However, if lithium metal is used, dendrites may be formed in the anode during a charge and may cause an internal short circuit. Further, lithium metal may react with the electrolyte on the surface of a lithium electrode, and, thus, a polymer film with a lack of conductivity may be formed. In some cases, the formation of dendrites and a polymer film may cause a sharp increase in resistance of the battery or particles to be isolated from a network for electronic conduction. Because of the above-described problems, lithium secondary batteries using lithium metal as an anode have not shown excellent charge and discharge characteristics in many cases.

In order to solve the problem occurring when lithium metal is used as the anode active material, the use of graphite as the anode active material instead of lithium metal has been suggested. Lithium ions are intercalated into space between graphite layers. Therefore, lithium is not usually extracted from an anode active material composed of graphite. Since lithium is not extracted, it is possible to prevent an internal short circuit caused by dendrites and also possible to solve other problems caused by the formation of dendrites. However, graphite has a small absorbing capacity equivalent to only 10% of the absorbing capacity expected when lithium metal is used as an anode active material.

Accordingly, research is being conducted for the purpose of developing a high-performance anode active material that suppresses the formation of dendrites and a polymer film on the surface of an anode, has a considerable lithium absorbing capacity and thus can substitute for graphite.

Meanwhile, when using a metal oxide, the metal oxide needs to be synthesized with care because a particle diameter of the metal oxide is relevant to the performance of an anode active material. If the metal oxide has a large particle diameter of 1 μm or more, the capacity and cycle efficiency may be decreased during charges and discharges. For this reason, research is being conducted to manufacture metal oxide particles of nanometer scale using various chemical synthesis methods.

Metal oxides, particularly iron oxide(III), have been expected to substitute for a graphite electrode as high-performance anode active materials due to their high theoretical capacity. Theoretically, iron oxide(III) has a lithium absorbing capacity of 1007 mAh/g, which is about three or more times the lithium absorbing capacity of the graphite electrode.

As a representative method for synthesizing iron oxide nanoparticles, a method of irradiating ultrasonic waves to an iron(II) hydroxide ($Fe(OH)_2$) aqueous solution has been known. Typically, the $Fe(OH)_2$ aqueous solution is prepared by adding sodium hydroxide (NaOH) to an iron(II) chloride ($FeCl_2$) aqueous solution.

However, the above-described method for synthesizing iron oxide nanoparticles is a difficult process because it is required to maintain inactive atmosphere and needs to use an expensive high-purity source material. Further, this method requires significant time for the whole process, and, thus, it is not easy to mass-produce the anode active material.

According to the conventional method, it is difficult to manufacture iron oxide(III) nanoparticles of fine and uniform particle diameter. Therefore, cracks may occur within an electrode due to volume expansion and contraction of the electrode during charges and discharges, which may result in a great loss of capacity and a sharp decrease in cycle efficiency.

Korean Patent Laid-open Publication No. 10-2014-0095869 discloses a method of preparing iron oxide through a heat treatment using an electric convection oven. However, the method of preparing iron oxide according to this prior art document requires a long-time reaction under enormous pressure to synthesize iron oxide. Therefore, it is still not easy to mass-produce the anode active material. Further, the iron oxide finally obtained is not porous, which causes a considerable change in volume during intercalation and deintercalation of lithium. Thus, the capacity is remarkably decreased by consecutive charges and discharges.

SUMMARY

An object to be achieved by the present disclosure is to provide an anode active material for secondary battery with improved lifespan and capacity characteristics.

Another object to be achieved by the present disclosure is to provide a manufacturing method of an anode active material for secondary battery including iron oxide nanoparticles which can be mass-produced by an environmentally friendly and simple process.

According to an aspect of the present disclosure, there is provided an anode active material for secondary battery, including: porous iron oxide nanoparticles with a specific surface area of from 1 $m^2/g$ to 80 $m^2/g$.

The anode active material for secondary battery may include a conductor and a binder.

The conductor may include a member selected from the group consisting of natural graphite, synthetic graphite, carbon black, acetylene black, ketchen black, denka black, and carbon fibers.

The binder may include a member selected from the group consisting of polyacrylonitrile, 6,6-nylon, polyurethane, polybenzimidazole, polycarbonate, polyvinyl alcohol, polylacetic acid, polyethylene-co-vinylacetate, polymethylmethacrylate, polyaniline, polyethylene oxide, collagen, polystyrene, polyvinylcarbazole, polyethylene terephthalate, polyamide, polyamideimide, polyvinylphenol, polyvinyl chloride, polyacrylamide, polycaprolactone, polyvinylidene fluoride, polyester amide, polyethylene glycol, polypyrrole, carboxymethyl cellulose, and combinations thereof.

According to another aspect of the present disclosure, there is provided a manufacturing method of an anode active material for secondary battery including porous iron oxide nanoparticles, including: preparing an iron-mixed solution by mixing an iron compound, a metal salt, and a solvent; and irradiating microwaves to the iron-mixed solution.

Preferably, the iron-mixed solution has a concentration of from 0.01 M to 0.05 M.

The iron compound may include a member selected from the group consisting of iron(II) nitrate, iron(III) nitrate, iron(II) sulfate, iron(III) sulfate, iron(II) acetylacetonate, iron(III) acetylacetonate, iron(II) trifluoroacetylacetonate, iron(III) trifluoroacetylacetonate, iron(II) acetate, iron(III) acetate, iron(II) chloride, iron(III) chloride, iron(II) bromide, iron(III) bromide, iron(II) iodide, iron(III) iodide, iron perchlorate, iron sulfamate, iron(II) stearate, iron(III) stearate, iron(II) oleate, iron(III) oleate, iron(II) laurate, iron(III) laurate, iron pentacarbonyl, iron enneacarbonyl, disodium tetracarbonyl ferrate, and mixtures thereof.

The metal salt may include a member selected from the group consisting of nitrate, carbonate, chloride salt, phosphate, borate, oxide, sulfonate, sulfate, stearate, myristate, acetate, acetylacetonate, hydrates thereof, and mixtures thereof.

The solvent may include a member selected from the group consisting of water, ethanol, isopropyl alcohol, propanol, butanol, ethylene glycol, diethylene glycol, triethylene glycol, propylene glycol, polyethylene glycol, polypropylene glycol, and mixtures thereof.

Preferably, the microwaves may be irradiated at output power range of from 100 W to 600 W.

According to yet another aspect of the present disclosure, there is provided a lithium secondary battery including: an anode including an anode active material including porous iron oxide nanoparticles; a cathode including a cathode active material; a separator; and an electrolyte.

The cathode active material may include at least one metal selected from the group consisting of lithium, cobalt, manganese, nickel, and combinations thereof.

The separator may include a member selected from the group consisting of polyethylene, polypropylene, polyvinylidene fluoride, or mixtures thereof.

Preferably, the electrolyte may be a non-aqueous electrolyte or a solid electrolyte.

According to the present disclosure, an anode active material for secondary battery including porous iron oxide nanoparticles minimizes a volume change of iron oxide caused by intercalation and deintercalation of lithium even during consecutive charges and discharges and thus can improve the capacity and lifespan characteristics of a secondary battery employing the anode active material.

According to the present disclosure, a manufacturing method of an anode active material for secondary battery including porous iron oxide nanoparticles makes it possible to manufacture an anode active material for secondary battery including porous iron oxide nanoparticles in an environmentally friendly and simple manner and thus makes it possible to mass-produce the anode active material for secondary battery including porous iron oxide nanoparticles through a simple process.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figures 1A, 1B:
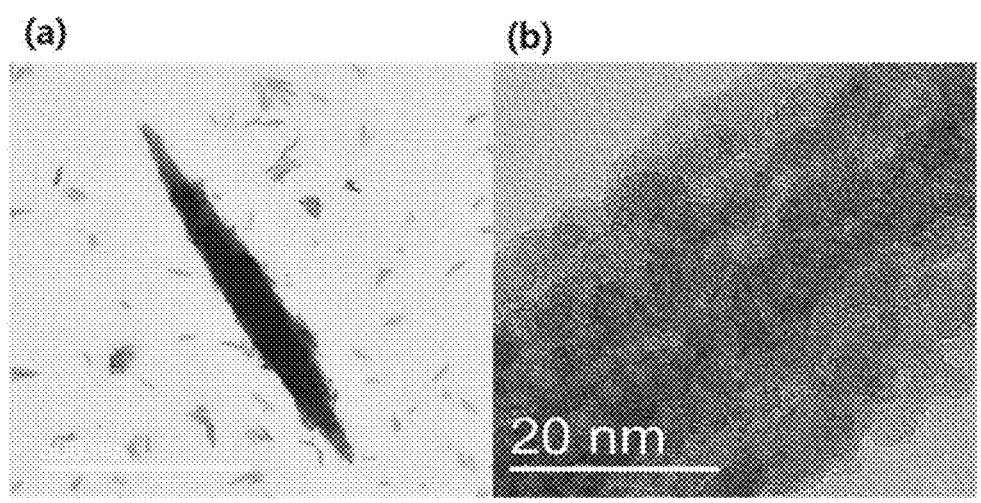
FIG. 1A are electron microscopic images of an anode active material for secondary battery manufactured according to an example of the present disclosure.
FIG. 1B are electron microscopic images of an anode active material for secondary battery manufactured according to an example of the present disclosure.

Hereinafter, the present disclosure will be described in more detail with reference to examples and the accompanying drawings.

An anode active material for secondary battery according to the present disclosure includes porous iron oxide nanoparticles with a specific surface area of from 1 $m^2$/g to 80 $m^2$/g.

Intercalation and deintercalation reactions of lithium ions vary depending on the surface characteristics of a material. A small specific surface area is unfavorable to these reactions.

A large specific surface area means a large reaction active area and is favorable to intercalation and deintercalation of lithium ions.

However, a specific surface area of a predetermined level or more may be disadvantageous to lifespan characteristics. An explosive reaction may cause destruction of a structure and may be disadvantageous to lifespan characteristics of the anode active material for secondary battery. Therefore, nanoparticles with an adequate specific surface area are favorable for the anode active material for secondary battery.

Further, if the specific surface area is formed mostly due to a porous structure, the porous structure can serve as a channel when lithium ions or an electrolyte moves. Thus, it can be advantageous to operation of a battery.

The anode active material including porous iron oxide nanoparticles have pores distributed uniformly within the particles and thus may have a large specific surface area.

Further, the electrolyte can easily flow into the pores, and, thus, a resistance to movement of lithium ions can be decreased and a reaction active site for the electrolyte can be maximized. Therefore, the output characteristics can be improved.

If the anode active material for secondary battery has a specific surface area of less than 1 $m^2$/g or more than 80 $m^2$/g, lithium ions may not be intercalated and deintercalated well during charges and discharges, which may result in degradation of cycle characteristics.

Preferably, the porous iron oxide nanoparticles may be included in the amount of from 60 wt % to 90 wt % based on the total weight of the anode active material.

The anode active material for secondary battery may further include a conductor and a binder.

The conductor may include a member selected from the group consisting of natural graphite, synthetic graphite, carbon black, acetylene black, ketchen black, denka black, and carbon fibers.

The conductor may be contained in a small amount for the purpose of improving electronic conductivity between active material particles and may employ any electronically conductive material that does not cause a chemical change without particular limitation.

Preferably, the conductor may be contained in the amount of from 5 wt % to 15 wt % based on the total weight of the anode active material.

The binder may include a member selected from the group consisting of polyacrylonitrile, 6,6-nylon, polyurethane, polybenzimidazole, polycarbonate, polyvinyl alcohol, polylacetic acid, polyethylene-co-vinylacetate, polymethylmethacrylate, polyaniline, polyethylene oxide, collagen, polystyrene, polyvinylcarbazole, polyethylene terephthalate, polyamide, polyamideimide, polyvinylphenol, polyvinylchloride, polyacrylamide, polycaprolactone, polyvinylidene fluoride, polyester amide, polyethylene glycol, polypyrrole, carboxymethyl cellulose, and combinations thereof.

The binder needs to maintain binding of the anode active material even during charge and discharge cycles and may employ any material that enables the anode active material to be well bound to the current collector and thus contributes to the stability of a battery without particular limitation.

Preferably, the binder may be contained in the amount of from 5 wt % to 15 wt % based on the total weight of the anode active material.

A manufacturing method of an anode active material for secondary battery including porous iron oxide nanoparticles according to the present disclosure includes: preparing an iron-mixed solution by mixing an iron compound, a metal salt, and a solvent; and irradiating microwaves to the iron-mixed solution.

Preferably, the irradiating of the microwaves to the iron-mixed solution may be performed when the temperature of the iron-mixed solution is in the range of from 100° C. to 300° C.

Further, iron oxide can be obtained through oxidation of the iron-mixed solution. An additional process for adjusting a pH is not needed.

Preferably, the irradiating of the microwaves may be performed for 10 minutes to 30 minutes.

The manufacturing method of an anode active material including porous iron oxide nanoparticles makes it possible to obtain a large quantity of uniform nanoparticles of several hundred nanometers using a non-toxic metal salt as a source material.

Further, the porous iron oxide nanoparticles are manufactured by irradiating the microwaves. Thus, a surfactant, a reductant, an oxidizer, and a co-precipitation agent which have been used in the conventional maturating method are not used. Therefore, no impurity remains even after the reaction and porous iron oxide nanoparticles can be manufactured in an environmentally friendly manner.

Preferably, the iron-mixed solution has a concentration of from 0.01 M to 0.05 M.

If the iron-mixed solution has a concentration of less than 0.01 M or more than 0.05 M, it is difficult to manufacture the anode active material including porous iron oxide nanoparticles to have a uniform particle diameter. Therefore, cracks may occur within an electrode due to volume expansion and contraction of the electrode during charges and discharges, which may result in a great loss of capacity and a sharp decrease in cycle efficiency.

Particularly, as the particle diameter of the anode active material increases, an internal stress of particles caused by a volume change increases.

Preferably, the anode active material including porous iron oxide nanoparticles has an average particle diameter of from 400 nm to 800 nm and has a spindle shape.

The iron compound may include a member selected from the group consisting of iron(II) nitrate, iron(III) nitrate, iron(II) sulfate, iron(III) sulfate, iron(II) acetylacetonate, iron(III) acetylacetonate, iron(II) trifluoroacetylacetonate, iron(III) trifluoroacetylacetonate, iron(II) acetate, iron(III) acetate, iron(II) chloride, iron(III) chloride, iron(II) bromide, iron(III) bromide, iron(II) iodide, iron(III) iodide, iron perchlorate, iron sulfamate, iron(II) stearate, iron(III) stearate, iron(II) oleate, iron(III) oleate, iron(II) laurate, iron(III) laurate, iron pentacarbonyl, iron enneacarbonyl, disodium tetracarbonyl ferrate, and mixtures thereof, and may include preferably iron(II) chloride, but is not limited thereto.

The metal salt may include a member selected from the group consisting of nitrate, carbonate, chloride salt, phosphate, borate, oxide, sulfonate, sulfate, stearate, myristate, acetate, acetylacetonate, hydrates thereof, and mixtures thereof, and may include preferably phosphate, but is not limited thereto.

The phosphate may be preferably sodium dihydrogen phosphate, but is not limited thereto.

The solvent may include a member selected from the group consisting of water, ethanol, isopropyl alcohol, propanol, butanol, ethylene glycol, diethylene glycol, triethylene glycol, propylene glycol, polyethylene glycol, polypropylene glycol, and mixtures thereof.

Preferably, the microwaves may be irradiated at output power range of from 100 W to 600 W.

If the microwaves are irradiated at output power of less than 100 W, a reaction may not be carried out sufficiently when the anode active material including porous iron oxide nanoparticles is manufactured. If the microwaves are irradiated at output power of more than 600 W, the temperature of a reaction solvent may be increased by excessive power output, which may cause a change in properties of the porous iron oxide nanoparticles.

As described above, according to the present disclosure, it is possible to manufacture an anode active material for secondary battery including porous iron oxide nanoparticles with controlled particle diameter and particle shape through a simple manufacturing process, and the anode active material can be used to manufacture a secondary battery with reduced loss of capacity during numerous charges and discharges.

A lithium secondary battery according to the present disclosure includes: an anode including an anode active material including porous iron oxide nanoparticles; a cathode including a cathode active material; a separator; and an electrolyte.

The cathode active material may include at least one metal selected from the group consisting of lithium, cobalt, manganese, nickel, and combinations thereof as a compound suitable for reversible intercalation/deintercalation of lithium. For example, the cathode active material may include $LiMn_2O_4$, $LiCoO_2$, $LiNiO_2$, $LiFeO_2$, $V_2O_5$, TiN, $MoS_2$, etc., but is not limited thereto.

The separator may include a member selected from the group consisting of polyethylene, polypropylene, polyvinylidene fluoride, or mixtures thereof, but is not limited thereto.

Preferably, the electrolyte may be a non-aqueous electrolyte or a solid electrolyte.

The non-aqueous electrolyte may employ a solution in which an electrolyte or a mixture of two or more electrolytes formed of a lithium salt such as $LiCF_3SO_3$, $Li(CF_3SO_2)_2$, $LiPF_6$, $LiBF_4$, $LiClO_4$, $LiN(SO_2C_2F_5)_2$ is dissolved in a non-proton solvent or a mixture of two or more non-proton solvents such as propylene carbonate (hereinafter, referred to as "PC"), ethylene carbonate (hereinafter, referred to as "EC"), butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, dimethyl carbonate (hereinafter, referred to as "DMC"), ethyl methyl carbonate (hereinafter, referred to as "EMC"), diethyl carbonate, methyl propyl carbonate, methyl isopropyl carbonate, ethyl butyl carbonate, dipropyl carbonate, diisopropyl carbonate, dibutyl carbonate, diethylene glycol, dimethyl ether, etc., but is not limited thereto.

Preferably, the solid electrolyte may employ a polymer with high ionic conductivity for lithium ions, such as polyethylene oxide, polypropylene oxide, polyethylene imine, etc., but is not limited thereto.

EXAMPLE

Preparation of Anode Active Material for Secondary Battery

Example: 1

An anode active material was prepared by mixing 0.04 M iron(II) chloride and 0.45 mM sodium dihydrogen phosphate in 40 ml of distilled water, stirring the mixture for 10 minutes, and irradiating microwaves to the mixture at 220° C. for 20 minutes.

As illustrated in FIG. 1A, it can be seen that the anode active material has a particle diameter of 600 nm.

Further, as illustrated in FIG. 1B, it can be seen that the anode active material is formed into a porous structure through self-assembly of spindle-shaped iron oxide particles with a diameter of about 50 nm.

Figure 2:
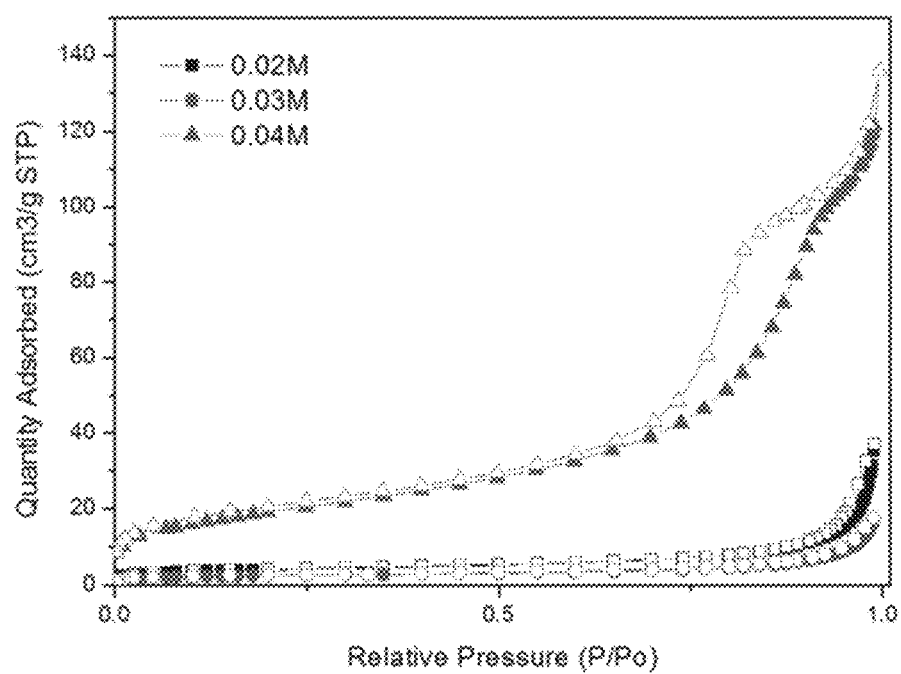
FIG. 2 is a graph illustrating the BET specific surface area of an anode active material for secondary battery manufactured according to an example of the present disclosure.

The specific surface area of the anode active material was measured using a BET specific surface area analyzer and illustrated in FIG. 2. It can be seen that the anode active material prepared according to Example 1 has a specific surface area of 70 $m^2/g$.

Comparative Example 1

An anode active material was prepared in the same manner as described in Example 1 except 0.04 M iron(II) chloride and 0.45 mM sodium dihydrogen phosphate.

The anode active material prepared according to Comparative Example 1 includes primary fine nanoparticles with a diameter of 40 nm or less.

Fabrication of Battery

Preparation Example 1

The 70 wt % anode active material prepared in Example 1, a 15 wt % conductor (carbon black), and a 15 wt % binder (CMC) were mixed to prepare slurry. The slurry was applied to a copper current collector and then dried in a 100° C. vacuum oven for 12 or more hours. Lithium metal as a counter electrode, 1.0 M $LiPF_6$/ethylene carbonate (EC): diethyl carbonate (DEC) (volume ratio of 1:1) as an electrolyte, and polyethylene as a separator were used to fabricate a coin-type half-cell.

Comparative Preparation Example 1

A coin-type half-cell was fabricated in the same manner as described in Comparative Example 1 except the anode active material prepared in Example 2.

In the battery fabricated in Comparative Preparation Example 1, the anode active material including fine particles prepared in Preparation Example 1 was used. Therefore, the particles underwent a volume change during charges and discharges, which resulted in a sharp decrease in capacity retention and cycle efficiency.

[Evaluation Result]

Battery Performance

The performance of a secondary battery including the anode active material for secondary battery prepared according to Example 1 was evaluated. A charge and a discharge of the secondary battery were tested in a charge and discharge region ranging from 3.0 to 0.005 V (vs. Li/Li$^+$), and the result was as illustrated in FIG. 3 and FIG. 4.

Figure 3:
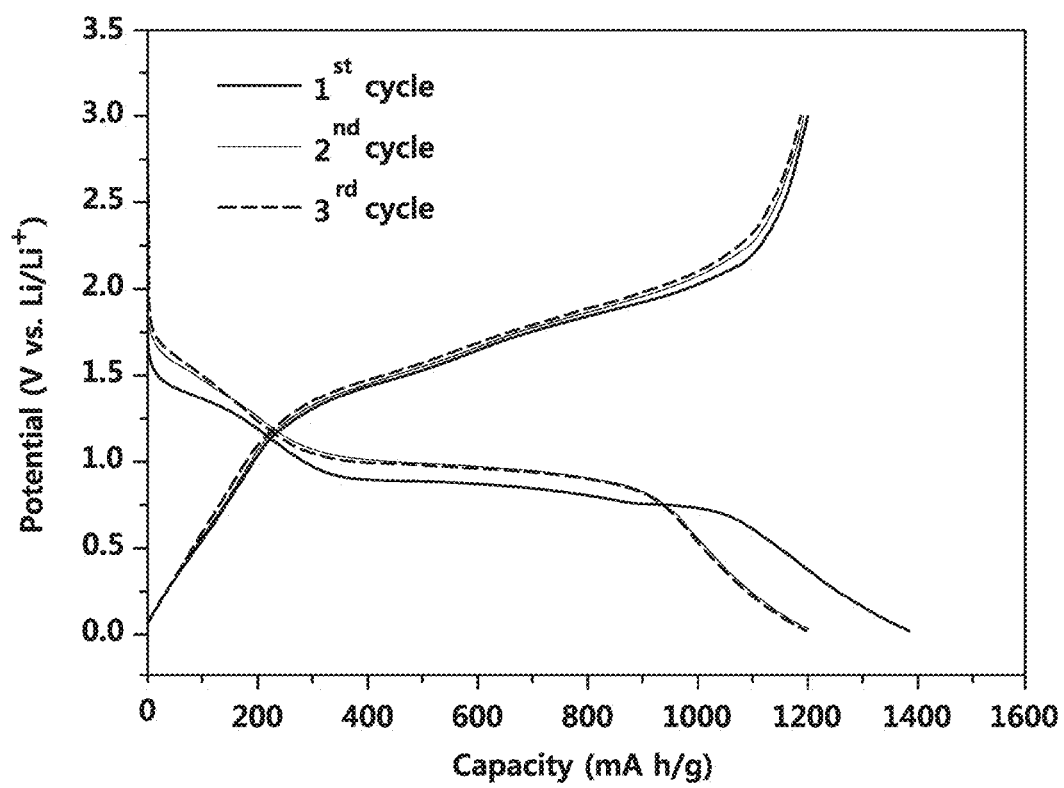
FIG. 3 is a charge/discharge curve illustrating a capacity depending on a voltage of a battery manufactured according to an example of the present disclosure.
Figure 4:
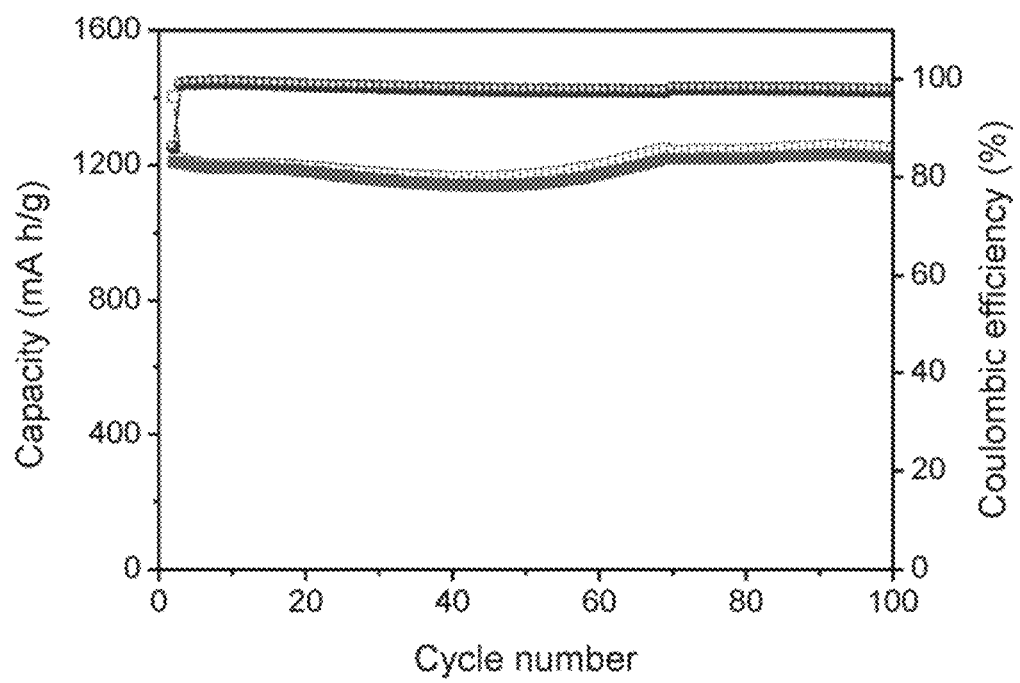
FIG. 4 is a lifespan graph illustrating a capacity depending on the number of charge and discharge cycles of a battery manufactured according to an example of the present disclosure.

As illustrated in FIG. 3 and FIG. 4, the battery including the anode active material prepared according to Example 1 had an initial charge and discharge efficiency (i.e. coulombic efficicency) of 86.5%, a discharge capacity of 1389.6 mAh/g, and a charge capacity of 1201.4 mAh/g, and the capacity was not much changed by intercalation and deintercalation of lithium ions during charges and discharges.

Further, the capacity depending on the number of charge and discharge cycles was constantly maintained in the range of from 1150 mAh/g to 1250 mAh/g with high comlombic efficiency (more than 98%) even after repeated 100 charges and discharges, which shows the improvement in lifespan characteristics.

What is claimed is:

1. A manufacturing method of an anode active material for secondary battery, the method comprising:
    mixing an iron compound, a metal salt, and a solvent to prepare an iron-mixed solution; and
    irradiating microwaves to the iron-mixed solution to form the anode active material through the self-assembly of spindle shaped iron oxide particles, wherein the iron-mixed solution has a concentration of from 0.01 M to 0.05 M; and
    wherein the microwaves are irradiated to the iron-mixed solution having a temperature range of from 100° C. to 300° C., output power range of from 100 W to 600 W for 10 to 30 minutes, and
    wherein the anode active material is formed into a porous structure and has a specific surface area of from 1 m2/g to 80 m2/g and an average particle diameter of from 400 nm to 800 nm.

2. The manufacturing method of an anode active material for secondary battery according to claim 1, wherein the iron compound includes a member selected from the group consisting of iron(II) nitrate, iron(III) nitrate, iron(II) sulfate, iron(III) sulfate, iron(II) acetylacetonate, iron(III) acetylacetonate, iron(II) trifluoroacetylacetonate, iron(III) trifluoroacetylacetonate, iron(II) acetate, iron(III) acetate, iron(II) chloride, iron(III) chloride (FeCl$_3$), iron(II) bromide, iron (III) bromide, iron(II) iodide, iron(III) iodide, iron perchlorate, iron sulfamate, iron(II) stearate, iron(III) stearate, iron (II) oleate, iron(III) oleate, iron(II) laurate, iron(III) laurate, iron pentacarbonyl, iron enneacarbonyl, disodium tetracarbonyl ferrate, and mixtures thereof.

3. The manufacturing method of an anode active material for secondary battery according to claim 1, wherein the metal salt includes a member selected from the group consisting of nitrate, carbonate, chloride salt, phosphate, borate, oxide, sulfonate, sulfate, stearate, myristate, acetate, acetylacetonate, hydrates thereof, and mixtures thereof.

4. The manufacturing method of an anode active material for secondary battery according to claim 1, wherein the solvent includes a member selected from the group consisting of water, ethanol, isopropyl alcohol, propanol, butanol, ethylene glycol, diethylene glycol, triethylene glycol, propylene glycol, polyethylene glycol, polypropylene glycol, and mixtures thereof.

5. The manufacturing method of an anode active material for secondary battery according to claim 1, wherein the microwaves are irradiated at output power range of from 100 W to 600 W.

* * * * *